United States Patent [19]
Person

[11] Patent Number: 4,462,542
[45] Date of Patent: Jul. 31, 1984

[54] HEATING SYSTEM

[76] Inventor: Thomas C. Person, 104 Robert Dr., Syracuse, N.Y. 13210

[21] Appl. No.: 262,525

[22] Filed: May 11, 1981

Related U.S. Application Data

[63] Continuation of Ser. No. 76,595, Sep. 18, 1979.

[51] Int. Cl.³ .............................................. F24D 3/08
[52] U.S. Cl. ..................................... 237/19; 126/132; 237/8 R; 237/51
[58] Field of Search .......................... 237/8 R, 51, 19; 126/132; 236/9 A; 165/103

[56] References Cited

U.S. PATENT DOCUMENTS

| | | | |
|---|---|---|---|
| 3,958,755 | 5/1976 | Cleer, Jr. | 237/51 |
| 4,019,677 | 4/1977 | Dotschkal et al. | 237/8 R |
| 4,046,320 | 9/1977 | Johnson et al. | 237/8 C |
| 4,139,152 | 2/1979 | Kronberger | 126/132 |
| 4,143,816 | 3/1979 | Skadeland | 126/132 |
| 4,153,199 | 5/1979 | Ellmer | 126/132 |
| 4,230,267 | 10/1980 | Dotschkal et al. | 237/8 R |
| 4,254,636 | 3/1981 | Zebuhr | 126/427 |

Primary Examiner—William R. Cline
Assistant Examiner—John F. McNally
Attorney, Agent, or Firm—Bruns & Jenney

[57] ABSTRACT

An auxiliary heating system for providing energy to a furnace and a domestic hot water heater. A heat transfer fluid is contained within a storage tank and is automatically routed between a heat exchanger located in an auxiliary heater, such as a fireplace or a wood burning stove, and a furnace as typically employed in a home or the like. The furnace may be a forced air system or a hydronic boiler system. In response to the sensed condition of the fire within the auxiliary heater and the demands of the furnace control thermostat, the heat transfer fluid is automatically circulated through one of a plurality of flow circuits so that the available energy contained in the fluid is used in the most efficient manner. A preheat coil is immersed in the storage tank through which domestic water is passed prior to its being delivered into the water heater.

3 Claims, 4 Drawing Figures

HEATING SYSTEM

BACKGROUND OF THE INVENTION

This application is a continuation of application Ser. No. 76,595 filed Sept. 18, 1979 entitled Heating System.

This invention relates to an auxiliary heating system that is capable of burning more plentiful and less expensive fuels such as wood or coal and which can be used to furnish energy to either a hot air furnace or a hydronic boiler and provide preheating of domestic hot water.

In U.S. Pat. No. 4,139,152 to Kronberger, there is shown a hot water basebaord heating system that is augmented by a typical fireplace suited for burning wood. Water is heated in the fireplace and is gravity fed into a first storage tank where the energy is used to preheat domestic hot water. From the first tank, the hot water is circulated via a pump into a second storage tank where the remaining energy is used to augment a hot water baseboard heating system. A separate expansion tank is provided to accommodate heat transfer fluid moving between the two storage tanks. Because of the number of heat transfer steps that are involved, the heat losses experienced by this type of system must be relatively high and the efficiency correspondingly low. Initial equipment and installation costs are also relatively high because of the amount and complexity of the equipment.

Other auxiliary heating systems have been devised for assisting more conventional comfort air heating systems and domestic hot water generators used in the home. However, these auxiliary systems generally exhibit relatively low operating efficiencies and are insensitive to actual furnace heating demands. The auxiliary heater is usually programed for a single mode of operation that will not vary regardless of the energy requirements of the primary system or systems.

SUMMARY OF THE INVENTION

It is therefore an object of the present invention to improve heating systems for augmenting the energy requirements of a comfort air furnace.

A further object of the present invention is to provide an automatic control system that is capable of routing energy between a primary and a secondary heating system in response to the energy demands placed on the primary system and the amount of energy available in the secondary system.

A still further object of the present invention is to improve the efficiency of a heating system for augmenting the energy required by a comfort air furnace and a domestic hot water heater.

Another object of the present invention is effectively utilized abundant low price fuels whenever possible in place of less available high price fuels in meeting the energy need in a building or the like.

Yet another object of the present invention is to provide an auxiliary heating system that will automatically collect energy that cannot be used immediately in the primary system and store it for future use.

These and other objects of the present invention are attained by means of a system for selectively moving a heat transfer fluid through one of three flow circuits passing between a heat exchanger mounted in an auxiliary heater, a furnace for furnishing comfort heating and a transfer fluid storage tank. A circulating pump and a plurality of electrical control valves are arranged to act in response to strategically located heat sensors so as to route the heat transfer fluid through a selected one of the three available flow circuits whereby the available energy developed in the auxiliary heater can be effectively used to provide comfort heating. Preheating of domestic hot water is also achieved by immersing the inlet line to the water heated within the fluid contained in the storage tank.

BRIEF DESCRIPTION OF THE DRAWINGS

For a better understanding of these and other objects of the present invention reference is had to the following detailed description of the invention which is to be read in conjunction with the accompanying drawings, wherein.

DESCRIPTION OF THE INVENTION

Figure 1:
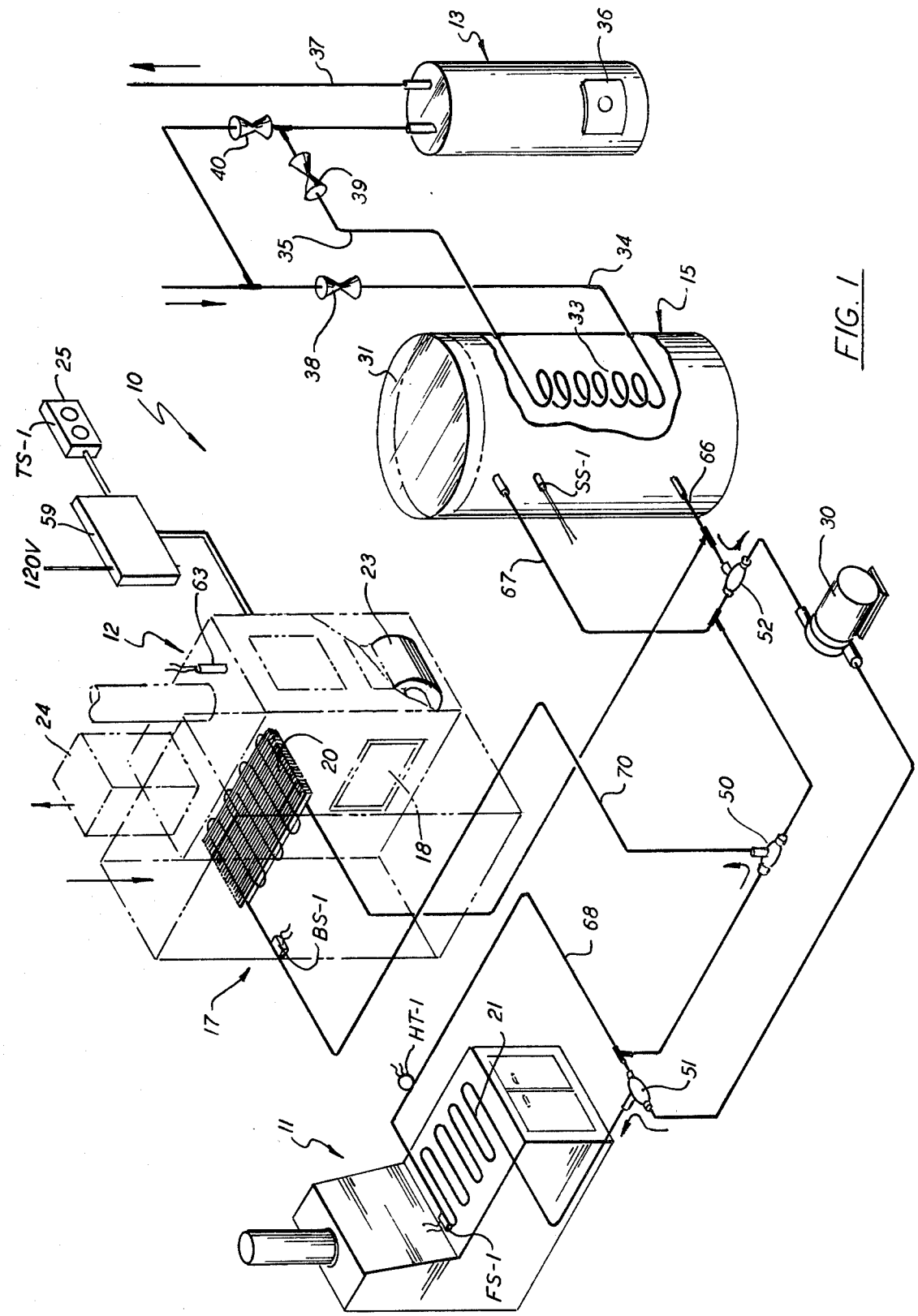
FIG. 1 is a schematic view in perspective illustrating an auxiliary heating system constructed in accordance with the teachings of the present invention shown operating in conjunction with a hot air furnace.

Referring initially to FIG. 1, there is shown a heating system, generally referenced 10, that embodies the teachings of the present invention. The present system includes an auxiliary heater 11 that is adapted to burn relatively abundant, low priced, fuels such as wood or coal to provide energy for augmenting or, under certain operating conditions, taking over the energy demands placed on a comfort air furnace 12 and/or a domestic hot water heater 13 that are designed to burn more expensive fuels which are in short supply. Through means of automatically operated controls, the energy generated by the auxiliary heater is either collected within a storage tank 15 or exchanged directly between the auxiliary heater and the furnace. The energy stored in the tank is used to preheat domestic hot water or is called upon to augment the furnace needs when the fire in the auxiliary heater dies down or goes out. Water is used in the present system as a heat transfer fluid for collecting and transporting energy between the various units. However, any suitable fluid for collecting and storing energy in the form of heat may be similarly employed.

Stationed adjacent to the furnace is a hot air plenum 17 which is typically part of the furnace return air system. The plenum is connected to the furnace by means of a mutually shared port 18 that is arranged to carry return air from the plenum to the heating chamber of the furnace. A fin type heat exchanger 20, mounted in the plenum, is specifically designed to efficiently reject heat into the stream of return air brought into the plenum via inlet duct 22. Under the influence of the furnace fan or blower 23, the return air is transported through the plenum into the furnace heating chamber and then returned to the comfort control zone serviced by the furnace through a hot air delivery duct 24. The heating demands placed on the furnace are regulated by a conventional thermostat 25 mounted at some remote location within the heating zone serviced by the furnace. Although not shown, flow directors may be used in the plenum to uniformly distribute incoming air over the entire working surface of the heat exchanger 20 thus assuring that an efficient transfer of energy is maintained between the water side and the air side of the unit.

For explanatory purposes, the auxiliary heater will herein be referred to as a wood burning stove. It should be clear, however, that any type of unit that is capable of effectively combusting fuels such as wood, coal and the like may be similarly utilized as the secondary source of energy in the system. A second heat exchanger 21 is mounted inside the firebox of the stove directly over the combustion region. In this case, the exchanger is a flat serpentine coil of tubing that makes a number of horizontal passes back and forth over the firebox. The coil is suspended from the roof of the stove using suitable hanger bolts (not shown).

The flat heat exchanger supported in the stove is connected in fluid flow communication with the storage tank 15 and the furnace heat exchanger 20 by means of appropriate tubing. As noted above, and as will be explained in greater detail below, water contained within the storage tank is circulated through a selected one of three distinct flow circuits using a motor driven circulating pump 30. The storage tank contains a sufficient amount of fluid so that the energy generated by the auxiliary heater can be conveniently collected and stored therein. An air space 31 is provided between the fluid level maintained in the tank and the roof of the tank to allow for expansion of the fluid during peak heating periods. A tank having a storage capacity of about 250 gallons has been found suitable for use in an average home.

A preheating coil 33 is immersed within the head transfer fluid contained in the storage tank. Incoming domestic water is delivered under normal pressure to the coil by line 34. After passing through the coil, the water is passed onto the domestic water heater via line 35 where it is heated to a desired level under the control of aquastat 36. Upon demand, the hot water is carried to various outlets located throughout the house by means of line 37. As can be seen, as the domestic water passes through the coil, it will automatically absorb whatever energy is available in the storage tank to preheat the incoming water and thus lower the energy demands placed on the hot water heater. Manually controlled gate valves 38-40 are provided in the domestic water lines to allow the preheating coil to be bypassed.

As previously pointed out, the heat transfer fluid collected in the storage tank can be selectively circulated through a number of different flow circuits. Routing of the fluid through the desired flow circuit is automatically achieved by means of three electrically controlled three-way valves 50-52. The valves are energized in response to temperature levels sensed at various strategic points using conventional heat sensitive switching means. For explanatory purposes, the flow of fluid will be straight through the valve when it is placed in an energized condition. The flow of fluid through the valve will be turned 90° as indicated by the arrows when the valve is in a deenergized condition.

Figure 2:
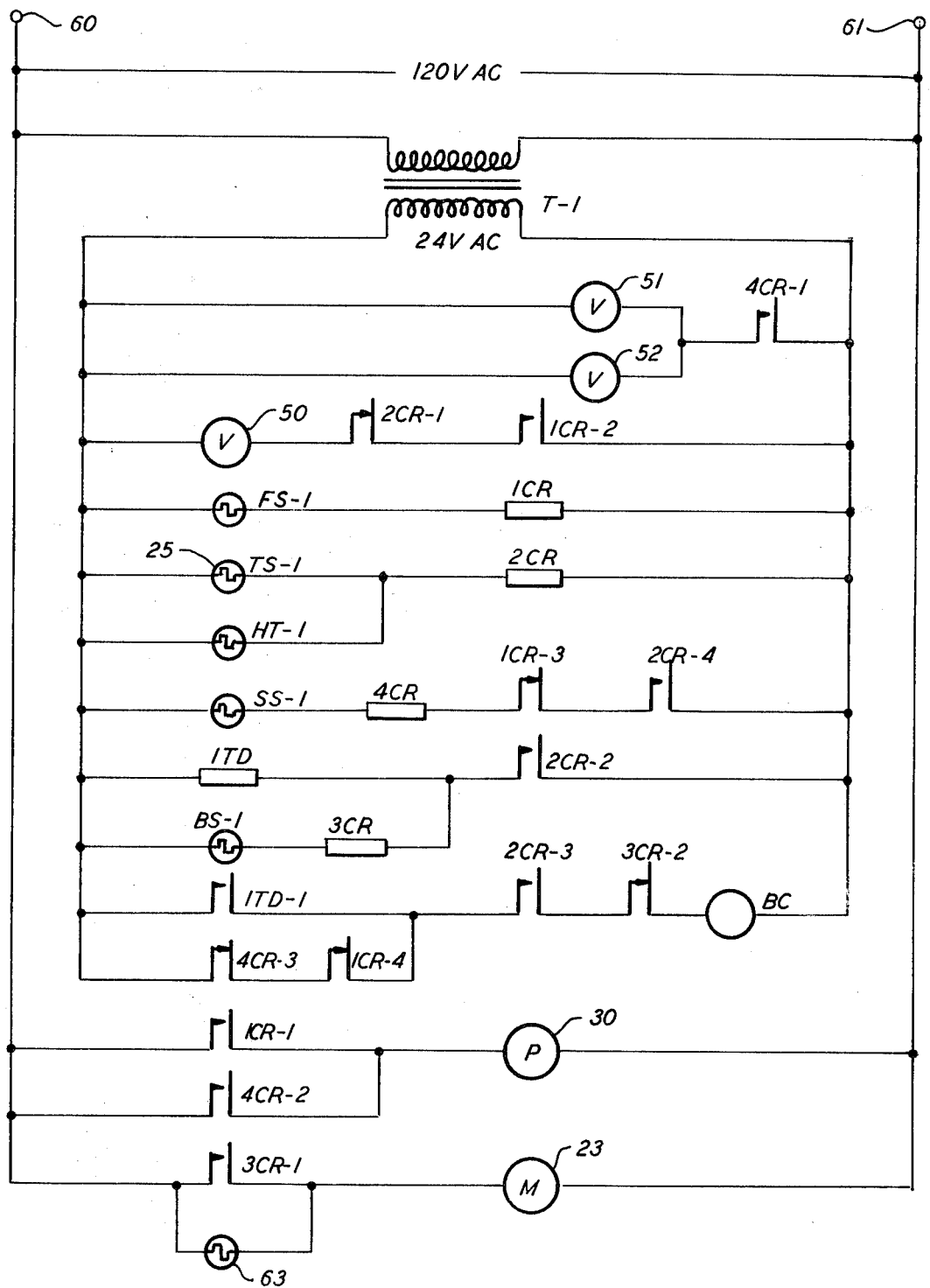
FIG. 2 is a wiring diagram showing the electrical controls used in conjunction with the heating system shown in FIG. 1.

The operation of the system shown in FIG. 1 will be explained in further detail with reference to the wiring diagram shown in FIG. 2. Except as otherwise noted, the electrical components are housed in a control panel 59. Terminals 60 and 61 are connected to a source of 120 volts AC power which is needed to operate the furnace fan 23 and the circulating pump 30. A portion of the original supply voltage is stepped down to 24 volts AC by means of a step down transformer T-1. The reduced voltage is used to provide power to various electrical control circuits associated with the present system.

When a fire is burning within the auxiliary heater and the temperature of the fluid in the heat exchange is raised above a predetermined level, a sensor FS-1 associated with the flat exchanger 21 is closed thereby providing a path for current to energize current sensitive relay 1CR. This, in turn, closes normally opened contact 1CR-1 in the pump motor circuit actuating the pump. At the same time, the energized relay pulls in contact 1CR-2 energizing valve 50. The remaining valves will be deenergized. Accordingly, the circulating pump draws fluid from the storage tank via lower outlet line 66, circulates the fluid through the stove mounted heat exchanger where it is heated to a higher energy level and returns the fluid via energized valve 50 back into the tank through upper return line 67. Accordingly, the available energy developed in the stove is collected in the fluid and brought back to the tank where it can be used in preheating domestic hot water or stored for future use.

When a fire is burning in the stove and the comfort air thermostat TS-1 calls for comfort heating, a new set of conditions are automatically sensed by the system. The thermostat TS-1 now closes causing a second relay 2CR to become energized. Normally closed contact 2CR-1 in the valve 50 circuit is pulled open deenergizing valve 50. Heat transfer fluid leaving the stove heat exchanger 21 via line 68 is now rerouted through line 70 to the furnace heat exchanger 20. All valves are now deenergized and the fluid leaving the furnace heat exchanger is accordingly delivered into the storage tank outlet line 66. The returning fluid is drawn into the suction side of the pump and recirculated through the two heat exchangers. In this mode of operation, all of the recoverable energy developed in the auxiliary heater is carried by the fluid directly to the furnace exchanger.

A temperature sensor BS-1 is placed in thermal communication with the furnace heat exchanger 20 and is adapted to monitor the temperature of the heat transfer fluid passing therethrough. In the event the sensed temperature is equal to or greater than the set point temperature of the device, the thermal switch closes thereby providing a path for current to reach relay 3CR. The relay will be energized as long as relay 2CR holds contact 2CR-2 closed. That is to say, 3CR will be energized if two conditions are met. First, the amount of energy transferred from the stove to the furnace must be above a predetermined level and second, the comfort control thermostat must be calling for heat. When the conditions are met and 3CR is energized, contact 3CR-1 in the furnace blower circuit closes and the blower is activated. In this mode of operation, the auxiliary heater is providing all the heat necessary to safisfy the comfort control thermostat. The system, sensing this condition, holds the furnace burner inactive while at the same time turning on the furnace fan or blower motor.

A time delay relay 1TD is shunted over the furnace heat exchanger sensor BS-1. The relay is energized through 2CR-2 when the thermostat TS-1 calls for heat. This starts a time delay period before which 1TD-1 is closed. During the delay, thermal switch BS-1 is sensing the available energy being furnished by the stove to see if it has reached the predetermined set point. If the set point temperature is not reached in the desired time frame, the time delay relay will pull in contact 1TD-1 in the burner control circuit and, because BS-1 is not closed, normally closed contact 3CR-2 in the same circuit remains closed. This, in turn, causes the furnace burner to be activated via burner control means BC whereupon energy to satisfy the comfort air demands is provided by both the burner and the auxiliary heater.

If the thermal switch of BS-1 is closed, 3CR is energized and 3CR-2 opens thereby breaking the burner control circuit.

When the fire in the auxiliary heater dies down or is extinguished and the comfort air thermostat is calling for heat, sensor SS-1 in the storage tank checks the energy available in the tank to see if it is high enough to help satisfy the comfort air demands. If the fluid temperature in the tank is equal to or above the sensor set point temperature, a path for current is provided through contacts 1CR-3 and 2CR-4 for energizing relay 4CR. Upon this happening, contact 4CR-1 is closed causing both valves 51 and 52 to be energized. Simultaneously therewith, contact 4CR-2 in the pump circuit is closed starting the circulating pump. The valves are now positioned to isolate the stove heat exchanger and fluid from the tank is circulated through the furnace heat exchanger to help supply the comfort air demands. If the fluid temperature level is greater than the set point of sensor BS-1, the burner control is shut down and the energy collected in the fluid is used to provide the comfort air heating.

Upon the temperature of the storage fluid falling below the set point of SS-1, the circulating pump is shut down, valves 51 and 52 are deenergized and the furnace burner is called upon to handle the entire comfort air heating load.

A high temperature sensor HT-1 is shunted over the thermostat 25 and functions to energize 2CR in the event the fluid temperature leaving the heat exchanger 21 becomes excessively high. With 2CR activated, contact 2CR-2 closes so that 3CR will be energized when BS-1 closes. These actions will form a closed loop circuit between heat exchanger 21 and heat exchanger 20. Blower motor 23 will be energized through contact 3CR-1 whereupon room air is used to cool the excessively high fluid temperature. If the capacity of the storage tank is relatively large, the fluid temperature leaving the heat exchanger 21 will seldom become excessively high.

Two normally closed contacts 4CR-3 and 1CR-4 are located in the burner control circuit and are placed in parallel over the time delay contact 1TD-1. Accordingly, the burner control will be able to be activated any time the stove fire is out and the storage tank energy level is low.

Figure 3:
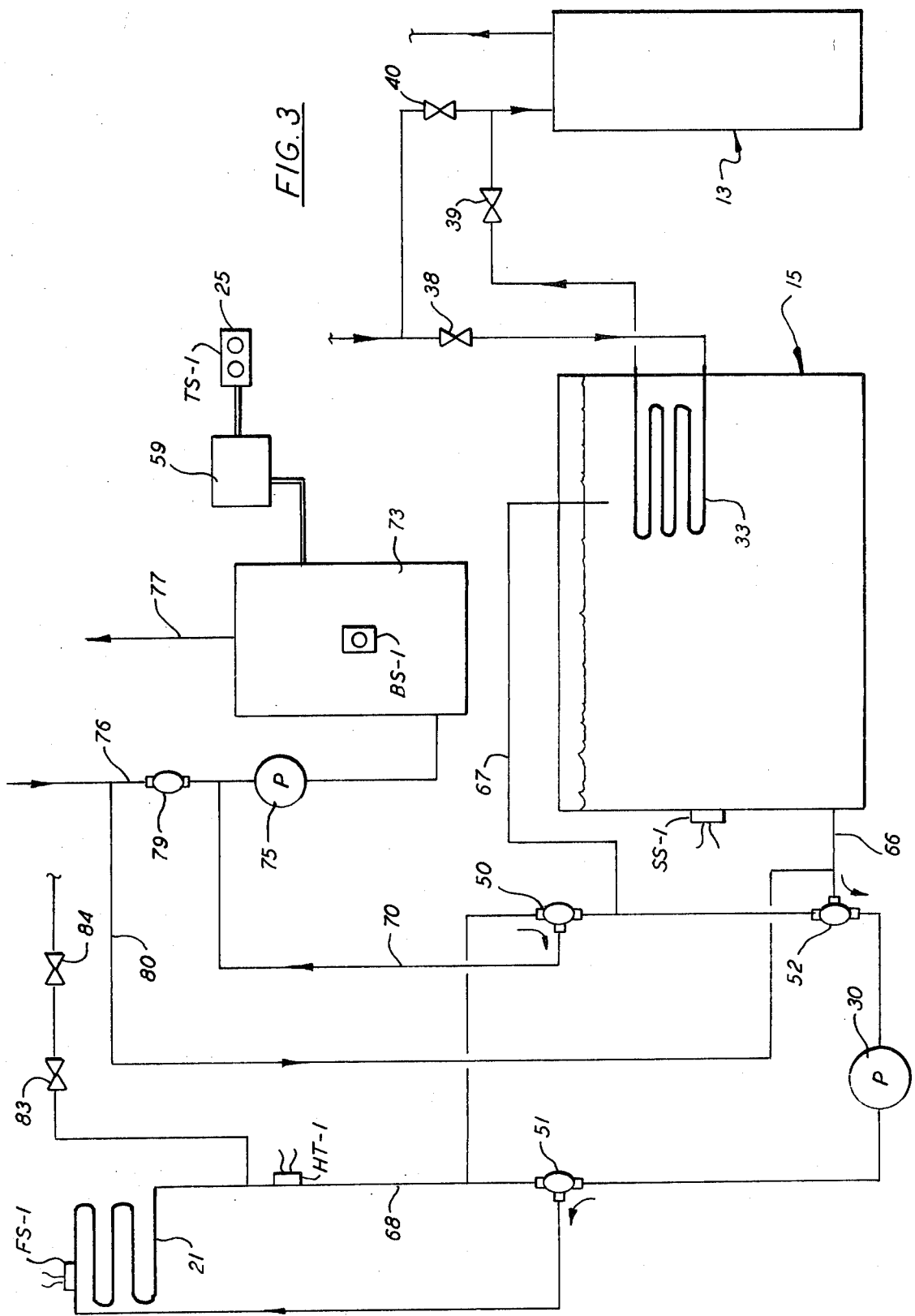
FIG. 3 is a schematic representation of a hydronic boiler system utilizing the teachings of the present invention.
Figure 4:
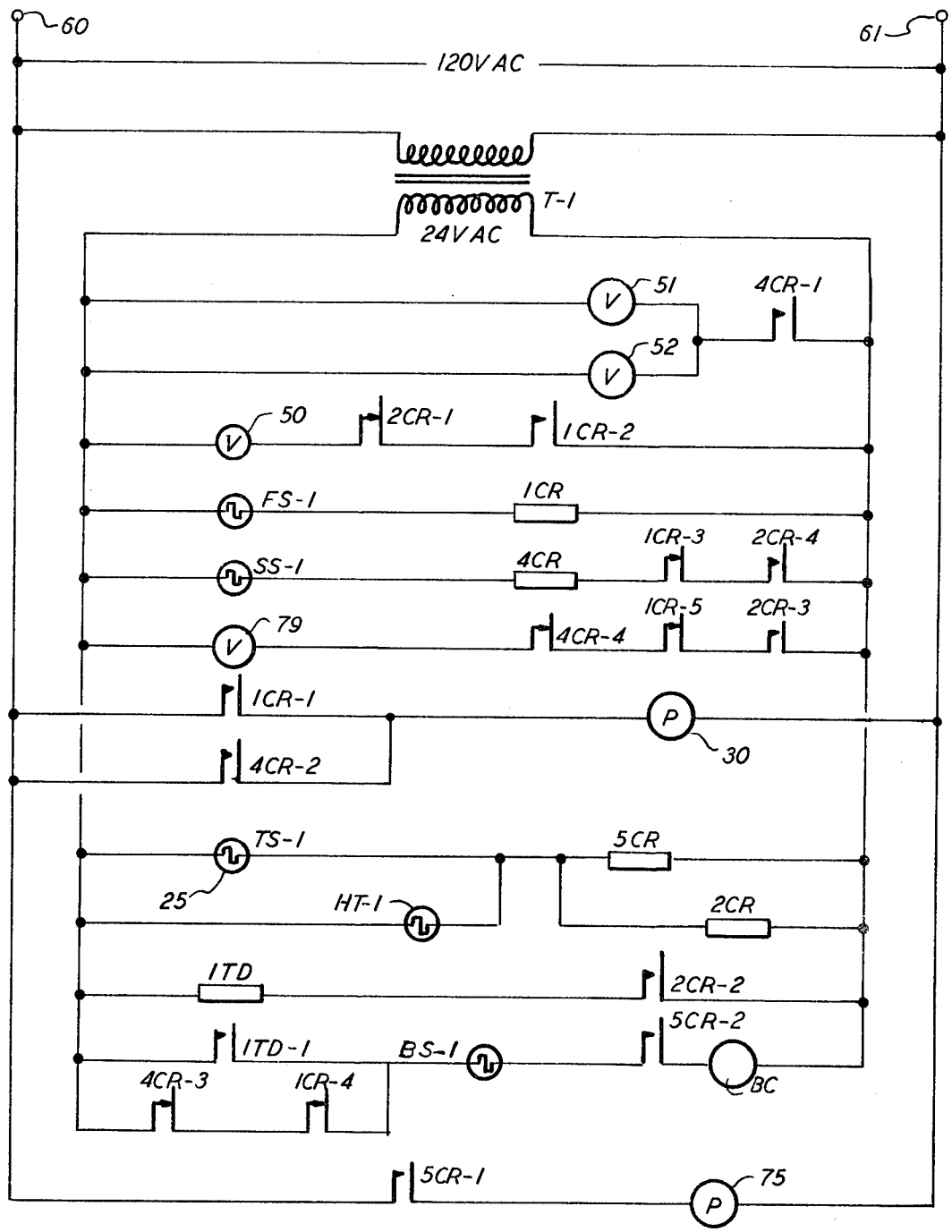
FIG. 4 is a wiring diagram showing the electrical controls used in conjunction with the heating system shown in FIG. 3.

A second embodiment of the present invention is shown in FIGS. 3 and 4 wherein the storage tank and the auxiliary heater are operatively connected into a hot water heating system employing a hydronic boiler 73 of conventional design. Like components utilized in this second embodiment which are the same as those shown in the first embodiment are referenced with like numbers. In this embodiment, the heat transfer fluid will be water and instead of delivering energy into a furnace mounted heat exchanger, the storage tank 15 and the auxiliary heater heat exchanger 21 will be connected directly into the hydronic boiler system in the manner set out below.

Here again, the system contains three flow circuits that are automatically controlled to route the heat transfer fluid so as to most efficiently use the energy available in the system. Similarly, a domestic hot water heater 13 is connected into the storage tank 15 via a preheating coil 33 to provide heating of the incoming water supply.

The hydronic boiler 73 is equipped with a circulating boiler pump 75 located in the hot water return line 76. When the boiler is in operation, the pump circulates hot water from the boiler to various heating units in the serviced region by means of delivery line 77. A normally closed, automatically operated, control valve 79 is also placed in the hot water return line between the entry points of lines 70 and 80.

With further reference to FIG. 4, normal 120 volt AC is stepped down via transformer T-1 to provide power to the various control circuits. Again, if sufficient energy is being supplied by the auxiliary heater, sensor FS-1 will be closed thus energizing relay 1CR. Contact 1CR-1 in the heat transfer fluid pump circuit closes starting the circulating pump 30. Contact 1CR-2 also closes, energizing valve 50 so that water is drawn from the storage tank and passed through heat exchanger 21. All other valves at this time are deenergized and the water leaving the heat exchanger is returned to the tank for storage.

In the event the thermostat TS-1 calls for heat, relay 2CR also becomes energized opening contact 2CR-1 and deenergizing valve 50. The water passing through the heat exchanger is routed through the valve to the boiler hot water inlet line 76 via line 70. Simultaneously therewith, relay 5CR in the thermostat circuit is also energized pulling closed contacts 5CR-1 in the boiler circulating pump circuit. This, in turn, starts the pump 75. With 1CR still energized, 1CR-5 remains open to maintain the control valve 79 in its normally closed condition. Accordingly, water returning to the boiler passes into line 80 and, under the influence of the circulating pump 30, is caused to pass through heat exchanger 21 before being returned to line 76 by means of line 70. The added energy absorbed in water is delivered back into the boiler system below closed valve 79 and is drawn into the boiler. If sufficient energy is added to the water to satisfy the boiler aquastat HX-1, the sensor will remain open thereby holding the burner control BC inactive.

With 2CR energized, contact 2CR-2 also closes, energizing relay 1TD in the time delay circuit. This operates as explained above to allow BS-1 sufficient time to sense the boiler water temperature before the burner is turned on.

When the fire in the auxiliary heater dies down, the fire sensor FS-1 opens, causing 1CR to deenergize and 1CR-5 to close. Also, contact 1CR-1 opens, thus shutting down the fluid circulating pump 30. The thermostat TS-1, still calling for heat, holds 2CR energized and thus 2CR-3 closed. In the event the tank sensor SS-1 senses insufficient energy to satisfy the thermostat demands, 4CR remains deenergized and contact 4CR-4 is closed. As a result, valve 79 is open. Both contacts 4CR-1 and 4CR-2 remain open holding valves 51 and 52 in a deenergized position. The contact 4CR-3 and 1CR-4 in the burner control circuit also close holding the burner control on as long as BS-1 calls for heat. The flow of hot water in the hydronic boiler circuit is now pulled directly into the boiler via line 76, bypassing the auxiliary heater circuits, heated by the burner in response to the aquastat, and delivered back to the system via line 77.

Tank sensor SS-1 can also detect the presence of sufficient energy in the storage tank to help supply the boiler need when the auxiliary heater is experiencing low temperature conditions. If the tank water temperature is above the set point of SS-1, 4CR will remain energized and 4CR-4 will thus be open causing valve 79 to close, routing the return water to the auxiliary circuits. Contact 4CR-2 also closes, turning on the fluid pump 30. The valves 50-52 are also positioned so that the return water coming back to the boiler is dumped into the storage tank and fresh make-up water for the boiler provided from the tank.

A high temperature safety sensor HT-1 is operatively connected to the exhaust line 68 of the heat exchanger. If the leaving water temperature is excessively high, the sensor closes thus by-passing the room thermostat TS-1. This, in turn, turns on the boiler pump and causes the water leaving the heat exchanger to be circulated through the boiler loop where the energy is rejected into the comfort air.

A relief valve 83 and a reducing valve 84 are also placed in line 68 as an added precaution to permit venting of the line in the event the heat exchanger temperature becomes dangerously high.

As should be evident from the disclosure above, the present system is capable of automatically delivering energy to a comfort air and domestic hot water system in response to the amount of energy that is available in the auxiliary heating loop. Similarly, the finned heat exchanger can be replaced by a hydronic heating unit to provide central hot water heating. While this invention has been described with specific reference to the details set forth above, it is not confined to this specific structure and this application is intended to cover any modifications and changes as may come within the scope of the following claims.

I claim:

1. Apparatus for efficiently utilizing heat energy from an auxiliary source that includes
   a flow line for circulating a heat transfer fluid through a loop,
   a pump connected into said flow line for moving said fluid through the loop in a given direction,
   first, second and third automatic three way diverting control valves connected in series in said flow line in the direction of flow and each of said valves being arranged to pass fluid circulating in said loop directly between an inlet connection and an outlet connection when said valve is energized whereby fluid passing through the valve is not diverted from said flow line,
   said first and second valves in the series being arranged to pass fluid between said inlet connection and a bypass connection when said first and second valves are deenergized whereby fluid moving in the line is diverted from the flow line,
   said third valve in the series being arranged to pass fluid between a bypass connection and said outlet connection when the valve is deenergized whereby fluid previously diverted from the line is returned to the loop,
   an auxiliary heating unit connected in series flow relation between the bypass connection of the first valve and the inlet of the second valve,
   a primary heating unit connected in series flow relation between the bypass connections of the second and third valves,
   a fluid storage unit connected in series flow relation between the outlet connection of the second valve and the bypass connection of the third valve, and
   control means for independently energizing each of said valves so that a selected one of said units is placed in fluid flow communication with either one of the remaining two units whereby fluid can be exchanged between any two of the three units.

2. The apparatus of claim 1 wherein said primary heating unit further includes a hydronic loop through which said heat transfer fluid is passed.

3. The apparatus of claim 1 that further includes heat sensing means for determining the temperature of the heat transfer fluid in the auxiliary heater and the storage tank and automatically energizing the valves in response thereto.

* * * * *